United States Patent Office 3,112,539
Patented Dec. 3, 1963

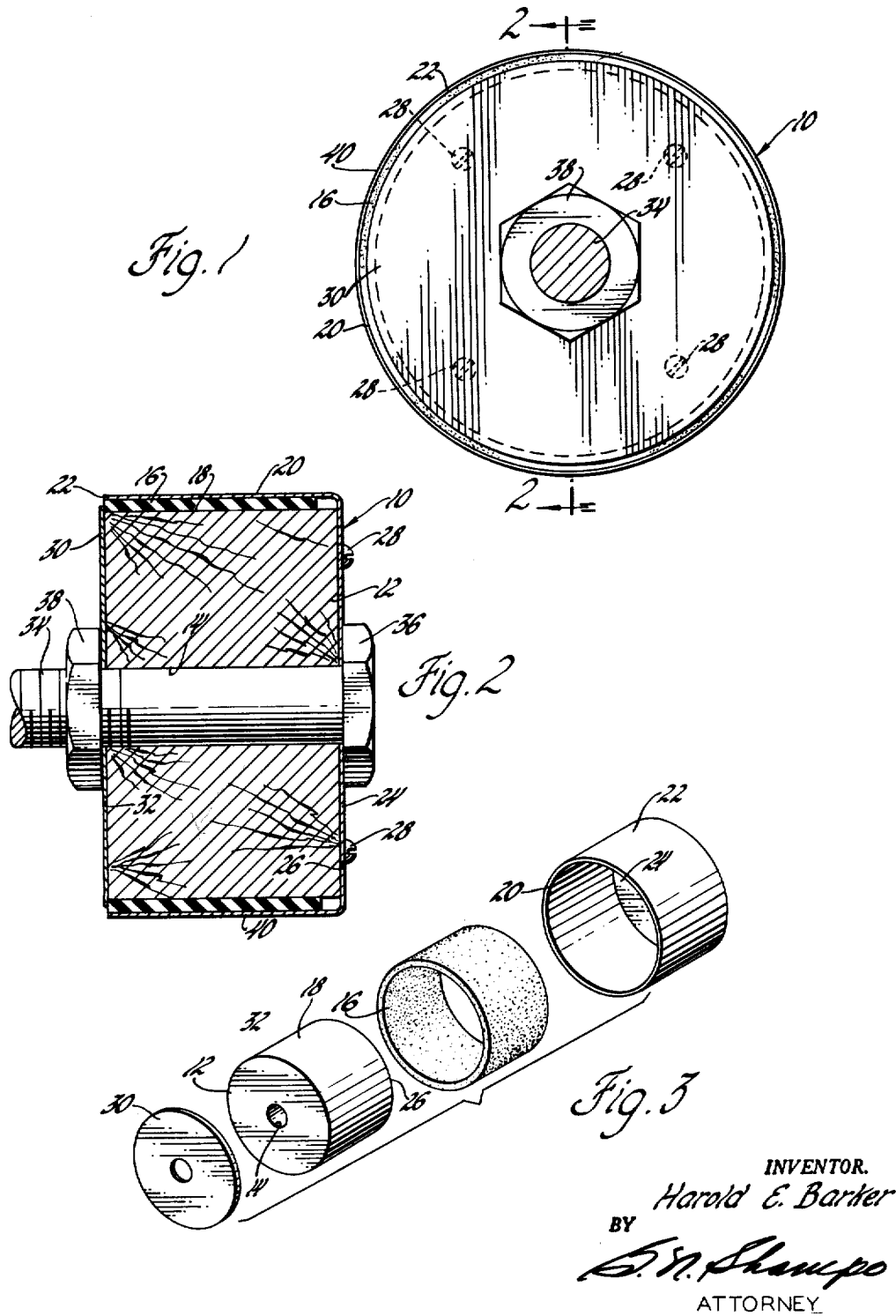

3,112,539
FORMING ARTICLES BY ARC PLASMA SPRAYING
Harold E. Barker, Greencastle, Ind., assignor to General Motors Corporation, Detroit, Mich., a corporation of Delaware
Filed Nov. 17, 1960, Ser. No. 69,868
1 Claim. (Cl. 22—200)

This invention relates to plasma-jet spraying and more particularly to the forming of articles by plasma-jet spray techniques.

Plasma-jet spraying is of particular interest in the manufacture of parts made from extremely hard-temperature materials. Difficultly formable shapes made of materials which are not readily subject to conventional manufacturing techniques can be produced quite easily by plasma-jet spray techniques. A part made of a metal such as tungsten can be formed by spraying a layer of tungsten on a suitable pattern. The tungsten layer is then intactly separated from the pattern to yield the formed part.

An especially vexing problem frequently inhibiting the formation of satisfactory hollow parts by plasma-jet spraying is the simultaneous rupturing of the sprayed layer while it is being formed. Although various solutions to this problem have been proposed, none has heretofore provided satisfactory results.

It is a principal object of the invention to provide an improved means of forming articles by plasma-jet spraying.

Other objects, features and advantages of the present invention will become more apparaent from the following description of a preferred embodiment thereof and from the drawing, in which:

FIGURE 1 shows an end view of an improved device on which a cylindrical article can be formed by plasma-jet spraying;

FIGURE 2 shows a cross-sectional view along the line 2—2 of FIGURE 1; and

FIGURE 3 contains an exploded elevation view, in perspective, of the device shown in FIGURES 1 and 2.

The invention comprehends forming hollow articles by plasma-jet spraying using a rotating mandrel which has sufficient rigidity to maintain a predetermined configuration but which is readily deformable. A hard core member is used to impart rigidity to the mandrel while a thin metal sheath and an interlayer of resilient material are used to make the mandrel susceptible to deformation.

As shown in the drawing, one embodiment of the invention includes a cylindrical mandrel 10 upon which a cylindrical article (not shown) can be formed by plasma-jet spraying. The mandrel includes a cylindrical wooden core member 12 having an axial aperture 14 therein for mounting purposes. A layer of a resilient material 16, such as silicone rubber, circumferentially surrounds the outer axial surface 18 of the core member 12. A cup-shaped sheath 20 of a metal, such as aluminum, forms the outer part of the mandrel. The sheath, or cup, 20 is positioned so that the resilient material 16 forms an interlayer between the cylindrical wall 22 of the sheath, while the bottom 24 of the cup is in direct contact with the front radial surface 26 of the mandrel. The sheath 20 is secured to the core 12 by means of threaded members 28 on the front radial surface 26 of the wooden core. A disk-like heat shield 30 is disposed against the back radial surface 32 of the core 12.

The interlayer of the resilient material 16 preferably has an axial dimension somewhat lesser than that of the core member to permit axial extrusion of the resilient material during formation of the coating on the mandrel.

The mandrel is mounted on a bolt 34 having a head 36 and locked in place thereon by means of a threaded member 38. The end of the bolt (not shown) is appropriately mounted in a chuck (also not shown) for rotating the mandrel during formation of the coating. The mandrel is preferably continuously rotated during coating formation and the plasma-jet spray gun oscillated to build up a fairly uniform coating on the surface 40 of the mandrel. Thus, the invention particularly lends itself to the formation of parts having a generally annular cross section.

The core can be formed of virtually any rigid material. A wooden core is preferred when making only a small number of parts. In the event the mandrel is to be used to form a large number of parts, it may be preferred that the core material be of a suitable plastic or metal to provide longer mandrel life. The interlayer or cushion between the core member and the sheath can be of any suitable resilient material, such as silicone rubber. The interlayer can be formed, for example, by casting a room temperature vulcanizable rubber in place around the core or by forming a tube of rubber which is subsequently slipped into place over the wooden core member. The sheath is preferably of a material which does not form a strong bond with the material being sprayed. A metal, such as aluminum, is particularly satisfactory since the tenacious oxide film on the surface of aluminum inhibits bonding or virtually any substance to the surface of the aluminum.

Although the device specifically described herein is shown in a cylindrical configuration, it is to be understood that the invention can also be used in forming other types of hollow parts. Configurations which are spheroidal, conical, frusto-conical, cup-shaped, etc. can be attained with mandrels of a similar construction but more appropriate configuration.

The relative size of the core member used is primarily dependent upon the size of the part being formed. The size of the core member is secondarily dependent upon the desired thickness of the resilient interlayer and the sheath. The resilient interlayer generally need not be thicker than ⅛ inch for a mandrel having a diameter up to five inches. On larger parts it may be preferable to use a resilient interlayer up to one inch in thickness. Although it is preferred to employ an interlayer of uniform thickness, it may be desirable to employ an interlayer of varying thickness for the formation of certain parts.

When the sheath is formed of a metal such as aluminum it should be at least 0.02 inch in thickness to prevent warpage due to localized heating during plasma-jet spraying. Exceptionally heavy sheath thicknesses, in excess of about 0.1 inch, are generally undersirable, even for making large parts. In most instances satisfactory results are attained using sheath thicknesses between about 0.02 inch and 0.04 inch.

Although the invention has been described in connection with a certain specific embodiment thereof, no limitation is intended thereby except as defined in the appended claim.

I claim:

The method of making a hollow article by plasma-jet spraying, said method comprising rotating a resilient mandrel having a rigid core, a thin ductile aluminum sheath and an interlayer of silicone rubber, plasma-jet spraying a layer of tungsten onto an axial surface of said mandrel and intactly separating said layer from said mandrel to yield a hollow article.

References Cited in the file of this patent

UNITED STATES PATENTS 1,128,059   Schoop _____ Feb. 9, 1915

(Other references on following page)

UNITED STATES PATENTS

| | | |
|---|---|---|
| 1,128,058 | Schoop | Feb. 9, 1915 |
| 2,171,599 | Reid | Sept. 5, 1939 |
| 2,629,907 | Hugger | Mar. 3, 1953 |
| 2,922,869 | Giannini et al. | Jan. 26, 1960 |
| 2,966,423 | Shichman | Dec. 27, 1960 |
| 2,983,570 | Lux | May 9, 1961 |
| 2,998,922 | Gibson | Sept. 5, 1961 |

OTHER REFERENCES

Welding Engineer, pp. 50, 51, February 1959.
Jour. of Metals, pages 40–42, January 1959.
Scientific American, vol. 197, No. 2, August 1957, pp. 80–88.
Popular Science, vol. III, No. 2, pp. 121, February 1959.

UNITED STATES PATENT OFFICE
CERTIFICATE OF CORRECTION

Patent No. 3,112,539                                                  December 3, 1963

Harold E. Barker

It is hereby certified that error appears in the above numbered patent requiring correction and that the said Letters Patent should read as corrected below.

Column 1, lines 13 and 14, for "hard-temperature" read -- hard high-temperature --; line 19, for "on" read -- onto --; same column 1, line 40, for "elevation" read -- elevational --; column 2, line 26, for "or" read -- of --.

Signed and sealed this 26th day of May 1964.

(SEAL)
Attest:

ERNEST W. SWIDER                                           EDWARD J. BRENNER
Attesting Officer                                              Commissioner of Patents